Sept. 17, 1957 J. T. W. MOSELEY 2,806,457
MANIFOLD
Filed March 7, 1955
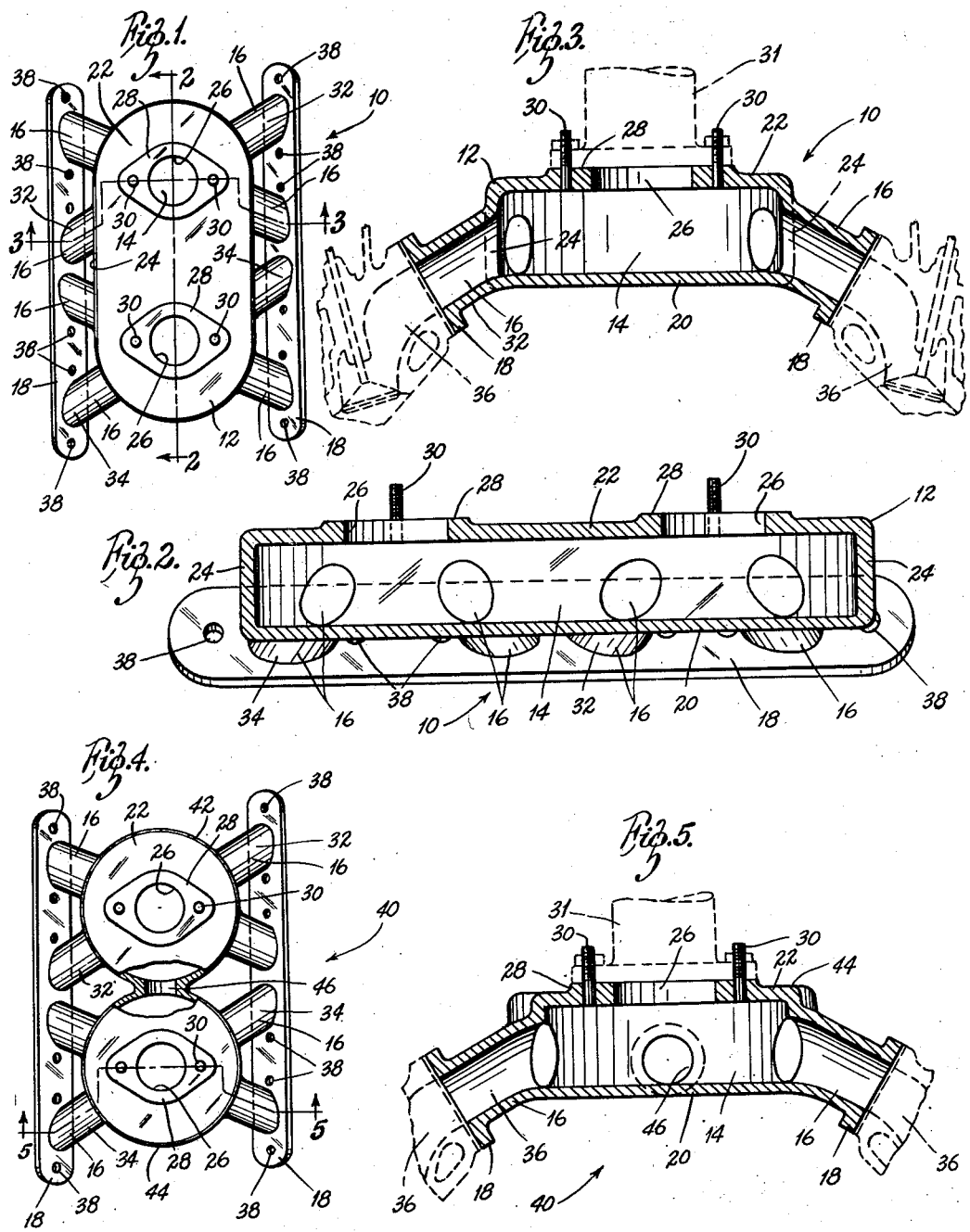
INVENTOR:
JAMES T. W. MOSELEY,
BY Kingsland, Rogers & Ezell
ATTORNEYS United States Patent Office 2,806,457
Patented Sept. 17, 1957

2,806,457
MANIFOLD
James T. W. Moseley, Richmond Heights, Mo.
Application March 7, 1955, Serial No. 492,360
12 Claims. (Cl. 123—52)

The present invention relates generally to internal combustion engine installations, and more particularly to a novel manifold for internal combustion engines whereby fuel and air mixtures are conducted with improved efficiency from one or more carburetors to the individual intake ports of a multicylinder engine.

With the current emphasis on increased power and efficiency in automotive engine installations, careful attention must be focused, not only upon the engine itself, but upon each of the several elements and systems which cooperate with the engine to enable it to perform its power producing function. Particularly is this true with respect to the fuel induction system, since inefficiency here must, perforce, affect the overall efficiency of the power plant. Briefly then, the present invention has for its general object an improved operating efficiency in automobile power plants to be effected through improved efficiency in the distribution of the fuel mixture.

More specifically, it is an object of the present invention to provide a novel intake manifold for use with internal combustion engines whereby a combustible vapor may be received and equally distributed with minimum segregation of its constituents.

It is another object of the invention to provide a novel manifold which incorporates a mixing or surge chamber having a plurality of relatively short conduits of substantially equal length leading outwardly therefrom.

It is another object of the invention to provide a novel intake manifold for an internal combustion engine of the V-type comprising a central mixing chamber for blending the fuel-air mixture from a plurality of carburetor barrels before it is conducted to the various cylinders.

It is another object of the invention to provide a novel intake manifold system for a V–8 engine, comprising dual star type manifolds disposed between the parallel banks of cylinders, one of the dual manifolds supplying the forward four cylinders and the other supplying the rearward four cylinders.

It is another object of the invention to provide a novel intake manifold system wherein the back pressure waves caused by the abrupt closing of the intake valves of the engine are utilized to aid in maintaining the fuel-air mixture after it leaves the carburetor and before it is distributed to the various cylinders.

It is another object of the invention to provide a novel manifold incorporating a surge chamber and having a plurality of generally outwardly directed distributing conduits communicating with the surge chamber at the lowest level of the latter.

The foregoing, as well as additional, objects and advantages will become apparent from the following description, taken in conjunction with the accompanying drawings, in which:

Figure 1 is a top plan view of a manifold constructed in accordance with the teachings of the present invention;
Figure 2 is an enlarged vertical sectional view taken generally along the line 2—2 of Figure 1;
Figure 3 is an enlarged vertical sectional view taken generally along the line 3—3 in Figure 1, and illustrating in dotted outline fragmentary portions of an engine and a carburetor with which the manifold is assembled;
Figure 4 is a top plan view of a modified manifold which also conforms to the teachings of the present invention; and
Figure 5 is a vertical sectional view taken generally along the line 5—5 of Figure 4, and again showing the manifold connected between a carburetor and an engine shown fragmentarily in dotted outline.

Referring to the drawing more particularly through the use of reference characters, the numeral 10 designates generally one manifold which conforms to the teachings of the present invention. This manifold 10 is shown in Figures 1, 2 and 3 as a unitary structure comprising a main body portion 12 defining a chamber 14, a plurality of tubular conduits 16 extending outwardly and downwardly from the body portion 12, and a pair of mounting strips 18 at the terminal ends of the conduits 16.

Preferably constructed of metal, the star-like manifold 10 may be molded in whole or in part, or it may be fabricated from suitable tubular and flat stock appropriately welded to a configuration such as that shown in the drawings. However constructed, the body portion 12 includes a floor plate 20 and a cover plate 22 both formed symmetrically about a longitudinal center line such as that indicated by the line 2—2 in Figure 1. Although not a requirement of the invention, the rounded end configuration depicted in Figure 1 is preferred for the body 12. A vertical wall 24 joins the plates 20 and 22 and with them defines the aforementioned chamber 14.

A cover plate 22 of the body portion 12 is provided with one or more inlet openings 26, it being understood that these openings 26 are located, not only symmetrically with respect to the centerline 2—2, but also so as to be in particular relation with respect to the conduits 16, as will appear. Each of the openings 26 is provided with a conventional mounting pad 28 having the usual studs 30 upstanding therefrom for mounting a carburetor 31, shown fragmentarily in dotted outline in Figure 3. Obviously, the carburetor 31 could be of either the single-barrel or the multibarrel type.

From Figure 1, it will be noted that each of the conduits 16 is so disposed that its axis intersects the vertical axis of an inlet opening 26. Where, as in the illustrated manifold 10, there are a plurality of openings 26, each conduit 16 is directed toward the axis of the closest opening 26. Normally, of course, a manifold 10 such as here disclosed will be constructed for use with a particular internal combustion engine having conventional inlet ports for admitting fuel to the individual cylinders of the engine. Thus, the relative locations of the outer ends of the individual conduits 16 will generally be predetermined through the requirement for communicating with the inlet ports of an existing engine design. With one end of each of the conduits 16 thus located, the several conduits 16 are disposed so that their axes are brought together in groups, the number of groups depending upon the number of carburetor barrels to be associated with the manifold, and hence the number of inlet openings 26 provided therein. Preferably, the axis of each opening 26 is disposed in a vertical plane defined by the axes of the two conduits 16 which have their outer ends farthest removed in approximately opposite directions from the mean center of the group of conduits 16 associated with the particular opening 26. Thus, for example, the upper opening 26 shown in Figure 1 is located with its axis in the plane defined by the axes of the conduits 16 which are further designated by the numeral 32, while the lower opening 26 is similarly located with reference to the conduits 16 which are further designated by the numeral 34.

With the openings 26 located as above described, the arcuate ends of the body portion 12 are preferably formed around the vertical axes of these openings as a center. Each of the conduits 16 is disposed so as to communicate over a generally straight path between its outlet end and the chamber 14, although it is obvious that at least some curvature will be in order where, for example, the outlet ends of the conduits must communicate with openings in a horizontal surface. It will be noted, particularly from Figures 2 and 3, that the invert of each conduit 16 coincides with the upper surface of the floor plate 20 and that from this point the conduits 16 are directed on a downward slope from the chamber 14. Normally, the degree of this downward slope, if any, will be determined by the inclination, if any, of the inlet ports, such as 36 shown in dotted outline in Figure 3, with which these conduits communicate. Likewise, the flange strip 18 will be formed for mating engagement with the associated engine and provided with screw holes 38 for securement thereto.

Figures 4 and 5 depict a manifold 40 which is similar in all respects to the manifold 10, except that the manifold 40 comprises dual body portions 42 and 44 interconnected through an equalizing tubular portion 46. Clearly, the manifold 40 is best used in conjunction with an even number of carburetors and thus has its openings 26 distributed equally between the body portions 42 and 44.

In use the manifolds 10 and 40 are assembled as part of a power plant installation, wherein they serve to receive a fuel mixture from one or more carburetors and to distribute the mixture to the individual cylinders of the engine with which they are associated. The central location of the one or more mixing or surge chambers with respect to the particular group of cylinders served by each, along with the substantially equal lengths of conduits between the surge chamber and the respective cylinders provides a heretofore unkown uniformity of distribution of the fuel-air mixture to the respective cylinders. This improved distribution makes for better economy of operation.

The constant agitation, or turbulence, that exists in the mixing or surge chamber due to the intermittent withdrawal of fuel charges through the variously spaced conduits provides thorough mixing and blending of fuel-air mixtures received from different carburetor barrels into the chamber. Moreover, this constant agitation enables atomized fuel to be retained in suspension without the necessity for providing heat, except possibly during a warm up period in extremely cold weather. The "cold" manifold not only enables the engine to provide increased torque while running at cooler temperatures, but materially improves idling characteristics in hot weather. Although not illustrated in the drawing, it is evident that the manifold of the present invention could be heated by application of heat, either by electrical heater or by passing hot gases in contact with the floor plate 20 for a short warm up period in extremely cold weather.

The manifold of the present invention is much less prone to icing than are conventional manifolds, due to the short direct conduits communicating the cylinders with the surge chamber. The direct communication afforded by this arrangement enables a certain amount of heat to be reflected from the cylinders back into the surge chamber and to the outlet end of the carburetor. This heat, of course, becomes available during the period of valve overlap, or, in other words, that period during which both the inlet valve and the exhaust valve of a particular cylinder are open.

Clearly, there has been described a manifold and a modification thereof which together fulfill the objects and advantages sought therefor.

It is to be understood that the foregoing description and the accompanying drawings have been given by way of illustration and example. It is further to be understood that changes in the form of the elements, rearrangement of parts, or the substitution of equivalent elements, all of which will be apparent to those skilled in the art, are contemplated as being within the scope of the present invention, which is limited only by the claims which follow.

What is claimed is:

1. An intake manifold for an internal combustion engine, said manifold comprising means defining a first and a second chamber, each of said chambers having a top inlet for admitting a fuel mixture thereinto, means defining a passage for intercommunicating said chambers, and means defining equal pluralities of substantially straight conducting passages of approximately equal length extending outwardly from the respective chambers for communicating the same with individual intake ports in the internal combustion engine, each of said chambers having an open volumetric capacity which exceeds the volumetric capacity of the several conduits extending therefrom.

2. An intake manifold for an internal combustion engine, said manifold comprising an enclosure having a floor plate and a cover plate of similar size and peripheral shape, and a vertical peripheral wall joining said plates, said cover plate being provided with an inlet for admitting a vaporous mixture into said enclosure, said wall being provided with a plurality of outlets for emitting the vaporous mixture from said enclosure, and a conduit for each of said outlets for conducting the fuel mixture to individual cylinder intake ports in an internal combustion engine, said conduits being substantially straight and of approximately equal length.

3. The manifold of claim 2 wherein the axes of said conduits slope downwardly from said enclosure, and wherein at least two of said axes intersect each other substantially on the vertical axis of said inlet.

4. The manifold of claim 3 wherein the cover plate is provided with a second inlet, and wherein at least two of said axes intersect each other substantially on the vertical axis of said second inlet.

5. An intake manifold for an internal combustion engine, said manifold comprising a plurality of enclosures, each enclosure having a floor plate, a cover plate, and a vertical peripheral wall, said cover plates being each provided with an inlet for admitting a vaporous mixture into the associated enclosure, said walls being each provided with a plurality of outlets for emitting the vaporous mixture from the associated enclosure, and a conduit for each of said outlets for conducting the fuel mixture to individual intake ports in an internal combustion engine, said conduits being substantially straight and of approximately equal length.

6. The manifold of claim 5 wherein there is an opening in each of said walls in addition to the outlets therein, and an additional conduit for intercommunicating said additional openings.

7. The manifold of claim 6 wherein each of said outlets adjoins a floor plate, and wherein the upper surfaces of the respective floor plates are at no less elevation than the maximum invert elevation of the conduits associated therewith.

8. The manifold of claim 7 wherein the axes of the conduits slope downwardly from the enclosures communicated therewith, and wherein at least two of said axes intersect each other substantially on the vertical axis of each of said inlets.

9. In a fuel induction system for a multicylindered internal combustion engine having parallel rows of inlet ports, the combination of manifold means comprising a central enclosure defining a single non-partitioned chamber having coextensive upper and lower walls joined by a peripheral wall disposed at a level above that of said inlet ports, a carburetor surmounting said enclosure, an inlet communicating the enclosure with the outlet of the carburetor, and individual conduits for communicating said enclosure with different engine ports, said conduits being of substantially equal length and each being directed generally toward a single enclosure inlet so as to provide line-of-sight communication therewith.

10. In a fuel induction system for a multicylindered internal combustion engine having parallel rows of inlet ports, the combination of manifold means comprising a plurality of enclosures each defining a single non-partitioned chamber having coextensive upper and lower walls joined by a peripheral wall disposed at a level above that of said inlet ports, a carburetor surmounting each of said enclosures, an inlet communicating each carburetor with its associated enclosure, and equal pluralities of individual conduits leading off from each enclosure for communicating the same with different engine ports, said conduits being of substantially equal length and each being directed generally toward a single enclosure inlet so as to provide line-of-sight communication therewith.

11. The combination of claim 10 wherein an interconnection is provided for directly intercommunicating the enclosures.

12. The combination of claim 9 wherein the enclosure is provided with a plurality of inlets and wherein at least one additional carburetor is provided, an equal number of conduits being directed toward each of the inlets.

References Cited in the file of this patent

UNITED STATES PATENTS

| | | |
|---|---|---|
| 1,365,564 | Strickland | Jan. 11, 1921 |
| 2,066,923 | Wolfard | Jan. 5, 1937 |
| 2,098,424 | Kolimbat | Nov. 9, 1937 |
| 2,733,695 | Goodridge | Feb. 7, 1956 |

FOREIGN PATENTS

| | | |
|---|---|---|
| 515,410 | Great Britain | Feb. 28, 1938 |